No. 859,435. PATENTED JULY 9, 1907.
F. M. CONLEE.
SAFETY DEVICE FOR ELECTRIC MOTORS.
APPLICATION FILED DEC. 9, 1905.
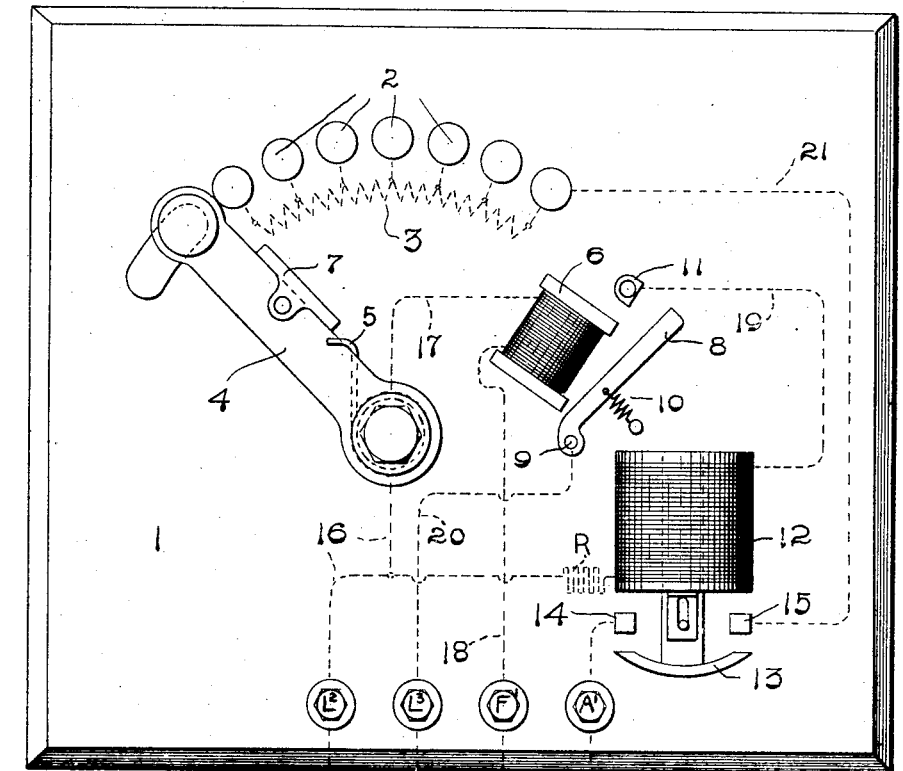
WITNESSES:
Minot G. Crozier.
Helen Alford
INVENTOR:
Frederick M. Conlee,
by Albert G. Davis
Atty.

UNITED STATES PATENT OFFICE.

FREDERICK M. CONLEE, OF MADISON, WISCONSIN, ASSIGNOR TO NORTHERN ELECTRICAL MANUFACTURING COMPANY, A CORPORATION OF WISCONSIN.

SAFETY DEVICE FOR ELECTRIC MOTORS.

No. 859,435.   Specification of Letters Patent.   Patented July 9, 1907.

Application filed December 9, 1905. Serial No. 291,128.

*To all whom it may concern:*

Be it known that I, FREDERICK M. CONLEE, a citizen of the United States, residing at Madison, county of Dane, State of Wisconsin, have invented certain new and useful Improvements in Safety Devices for Electric Motors, of which the following is a specification.

This invention relates to devices for controlling electric motor circuits and has for its object the provision of a device of this character which will protect the motor against accidents due to careless handling and other causes, in a reliable, safe and efficient manner.

My invention more specifically relates to protective devices for electric motor circuits. As is well known, many motors are destroyed by closing the armature circuit before the field connections are made. This mistake is often made even by experienced operators, and it is the object of my invention to guard against the occurrence of such an accident.

In carrying out my invention I provide an electromagnet in the field circuit of the motor which, when energized, will close the circuit of the armature. It will thus be impossible to close the armature circuit until the field connections are made. Moreover, if the field should be broken from any cause while running, the motor will be protected, since the armature circuit will immediately be opened.

In the single figure of drawing I have shown one embodiment of my invention.

Referring to the drawing, 1 is an insulating base of slate or soapstone provided with a series of studs 2 forming terminals of the starting resistance 3. A controlling arm 4 biased to the "off" position by means of a spring 5 moves over the studs in the usual manner. A no-voltage magnet 6 coöperates with the armature 7 to retain the arm in the running position. A switch arm 8 pivoted at 9 is mounted so as to be attracted by the magnet 6 against the tension of a spring 10. When the arm 8 is attracted by the magnet it makes contact with the stud 11. A second electro-magnet 12 is mounted upon the base and is provided with an armature having a bridging contact 13 for closing the circuit across the studs 14 and 15. The magnet 6 is connected in series with the field F of the motor, while the magnet 12 is connected across the line L L′ through the switch arm 8. The armature circuit is completed through the bridging contact 13.

The arrangement of circuits is as follows: When the proper connections are made to the binding posts L², L³, F′ and A′, current will pass from the line at L through conductors 16 and 17 to magnet 6, thence through conductor 18 to binding post F′ through the field and back to line. The magnet 6 being energized attracts the switch arm 8 against the stud 11, closing the circuit from line L through conductor 16, resistance R, electro-magnet 12, conductor 19, stud 11, switch arm 8 and conductor 20 back to line at L′. The magnet 12 being thus energized attracts its armature and bridges the contacts 14 and 15, closing the armature circuit so that when the controlling arm 4 is moved onto the first stud, the armature circuit will be closed as follows: from line L through conductor 16, arm 4, resistance 3, conductor 21, stud 15, bridge contact 13, stud 14, armature A and back to line. The arm 4 may then be moved to running position and retained there by the magnet 6. Upon failure of voltage, the arm will be turned to the "off" position and the armature circuit will be opened at the bridge 13 by the deënergizing of the magnets 12 and 6. If the field should be broken at any time during the operation of the motor, regardless of the position of the starting arm the armature circuit will immediately be interrupted to protect the motor.

It will thus be seen that I have provided means whereby it will be impossible to cause a motor to run away by making improper connections, since the armature cannot be closed until the field is energized sufficiently to close the armature circuit.

While I have shown my device in connection with a particular type of apparatus, namely, a motor starting rheostat, and have also shown a particular means for accomplishing my result, it should be understood that I do not limit my invention in its application to this particular type of device nor to the particular means shown, except as it is limited by the scope of the claims annexed to and forming a part of this application.

What I claim as new, and desire to secure by Letters Patent of the United States, is,—

1. The combination with an electric motor, of an electro-magnet in the field circuit, and an electro-magnetic device controlled thereby for closing the armature circuit.

2. The combination with a motor starting rheostat, of a no-voltage magnet in the field circuit, and an electro-magnetic device controlled thereby for closing the armature circuit.

3. The combination with an electric motor, of an electro-magnet in the field circuit, an electro-magnet connected across the line, means controlled by said first magnet for closing the circuit of said second magnet, and means controlled by said second magnet for closing the armature circuit.

4. The combination with a motor starting rheostat, of a no-voltage magnet in the field circuit, an electro-magnet connected across the line terminals, a normally open switch controlled by said first magnet for closing the circuit of said second magnet, and a normally open switch controlled by said second magnet for closing the armature circuit.

In witness whereof I have hereunto set my hand this fourth day of December, 1905.

FREDERICK M. CONLEE.

Witnesses:
A. J. BUENZLI,
E. A. LAMBRECHT.